United States Patent
Li et al.

(10) Patent No.: US 10,280,603 B2
(45) Date of Patent: May 7, 2019

(54) INLET VALVE WITH A SHORTENED LIFTING LEVER AND A METHOD OF SHORTENING THE LIFTING LEVER OF THE INLET VALVE

(71) Applicant: Feiyu Li, Xiamen, Fujian (CN)

(72) Inventors: Feiyu Li, Fujian (CN); Jusheng Xiong, Fujian (CN)

(73) Assignee: Feiyu Li, Xiamen (CN)

( * ) Notice: Subject to any disclaimer, the term of this patent is extended or adjusted under 35 U.S.C. 154(b) by 88 days.

(21) Appl. No.: 15/034,112

(22) PCT Filed: Mar. 27, 2015

(86) PCT No.: PCT/CN2015/075185
§ 371 (c)(1),
(2) Date: May 3, 2016

(87) PCT Pub. No.: WO2015/149651
PCT Pub. Date: Oct. 8, 2015

(65) Prior Publication Data
US 2016/0265205 A1 Sep. 15, 2016

(30) Foreign Application Priority Data
Mar. 31, 2014 (CN) .......................... 2014 1 0127390

(51) Int. Cl.
*E03D 1/32* (2006.01)
*F16K 31/32* (2006.01)
*F16K 31/26* (2006.01)

(52) U.S. Cl.
CPC .............. *E03D 1/32* (2013.01); *F16K 31/265* (2013.01); *F16K 31/32* (2013.01);
(Continued)

(58) Field of Classification Search
CPC .... E01D 1/32; E01D 1/33; E01D 1/36; F16K 31/32; F16K 31/265; Y10T 137/7472;
(Continued)

(56) References Cited

U.S. PATENT DOCUMENTS 160,930 A * 3/1875 McGuire ................. F16K 31/24
137/429
925,538 A * 6/1909 Weavercw .............. F16K 31/34
137/414
(Continued)

FOREIGN PATENT DOCUMENTS

CN 201772074 U 3/2011
CN 202790836 U 3/2013
(Continued)

*Primary Examiner* — Craig J Price
(74) *Attorney, Agent, or Firm* — Rabin & Berdo, P.C.

(57) ABSTRACT

An inlet valve having a shortened lifting lever mechanism includes a main body having defined therein a compression hole and a waterway passage; a sealing pad; a float; and a shortened lifting lever mechanism that is rotatably connected to the main body, that comprises at least two lever stages each having a fulcrum, respectively, and that include a first stage lever, and a last stage lever that are connected in a driving way. The float is coupled to the first stage lever so that a dynamic body is formed to drive the shortened lifting lever mechanism to move. The sealing pad is assembled to the last stage lever so that the sealing pad opens or closes the compression hole with the movement of the shortened lifting lever mechanism when the float moves up and down. A method of shortening a lifting lever mechanism of an inlet valve is also disclosed.

6 Claims, 11 Drawing Sheets

(52) U.S. Cl.
CPC ...... *Y10T 137/053* (2015.04); *Y10T 137/6004* (2015.04); *Y10T 137/7433* (2015.04); *Y10T 137/7475* (2015.04)

(58) Field of Classification Search
CPC ......... Y10T 137/7475; Y10T 137/7426; Y10T 137/7423; Y10T 137/7433; Y10T 137/7378; Y10T 137/7374; Y10T 137/7485; Y10T 137/053; Y10T 137/6004
USPC ....... 137/430, 432, 429, 444, 445, 414, 415, 137/448, 15.26, 315.08; 4/392, 315
See application file for complete search history.

(56) References Cited

U.S. PATENT DOCUMENTS

| | | | | |
|---|---|---|---|---|
| 993,587 A * | 5/1911 | Dodd et al. | ............... | F22D 5/12 137/428 |
| 1,612,195 A * | 12/1926 | Kirchhan | ............... | E03F 5/042 137/445 |
| 2,098,131 A * | 11/1937 | Bluhm | ............... | F16K 31/24 137/430 |
| 2,212,303 A * | 8/1940 | Ruskamp | ............... | F16K 31/24 137/441 |
| 2,214,863 A * | 9/1940 | Schultheiss | ............... | E03D 1/32 137/441 |
| 2,229,601 A * | 1/1941 | Park | ............... | F16K 47/02 137/215 |
| 2,235,299 A * | 3/1941 | Park | ............... | E03D 1/32 251/118 |
| 2,252,078 A * | 8/1941 | Kohlmeyer | ............... | E03C 1/108 137/109 |
| 2,278,000 A * | 3/1942 | Thompson | ............... | F16K 31/24 137/428 |
| 2,595,766 A * | 5/1952 | Clemmons | ............... | F16K 47/02 137/444 |
| 3,554,219 A * | 1/1971 | Hudson | ............... | E03D 1/32 137/414 |
| 3,599,659 A * | 8/1971 | Nuter | ............... | F16K 24/048 137/202 |
| 3,994,313 A * | 11/1976 | Brandelli | ............... | F16K 31/34 137/437 |
| 5,427,137 A * | 6/1995 | Bowen | ............... | B67D 7/365 116/204 |
| 5,551,466 A * | 9/1996 | De Pieri | ............... | F16K 1/12 137/1 |
| 5,613,513 A * | 3/1997 | Makowan | ............... | F16K 24/046 137/1 |
| 5,655,565 A * | 8/1997 | Phillips | ............... | B65D 90/26 137/413 |
| 5,988,201 A * | 11/1999 | Lebkuchner | ............... | F16K 24/048 137/202 |
| 6,575,706 B2 * | 6/2003 | Carnes | ............... | F04D 9/043 137/202 |
| 6,783,330 B2 * | 8/2004 | Carnes | ............... | F04D 9/042 137/202 |
| 7,559,337 B2 * | 7/2009 | Han | ............... | F16K 31/34 137/426 |
| 7,661,438 B2 * | 2/2010 | Nichols-Roy | ............... | F16K 31/26 137/411 |
| 8,132,273 B2 * | 3/2012 | Bouchard | ............... | E03D 1/00 137/410 |
| 8,166,997 B2 * | 5/2012 | Fukuzawa | ............... | E03D 1/32 137/434 |
| 8,631,818 B2 * | 1/2014 | Mitrovich | ............... | B60K 15/04 137/429 |

FOREIGN PATENT DOCUMENTS

| | | |
|---|---|---|
| CN | 103244744 A | 8/2013 |
| CN | 204326194 U | 5/2015 |
| DE | 202011109017 U1 | 3/2013 |

\* cited by examiner

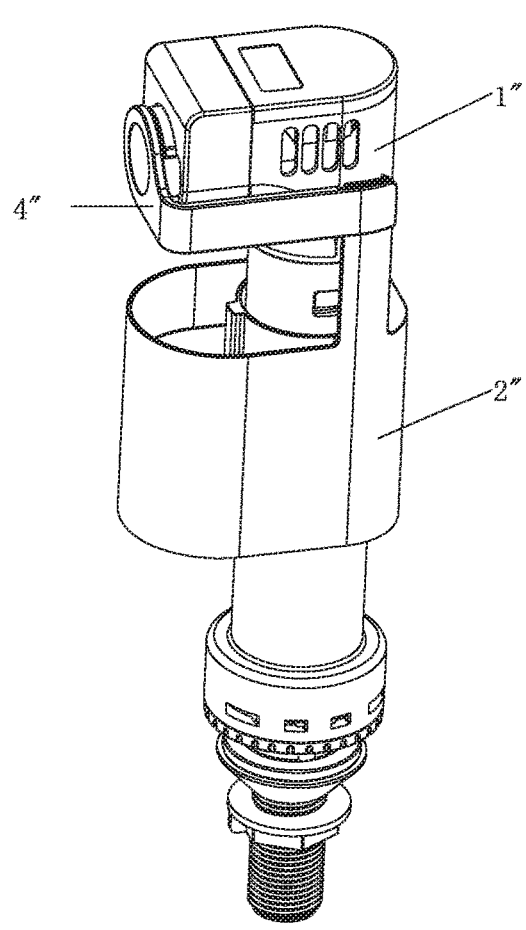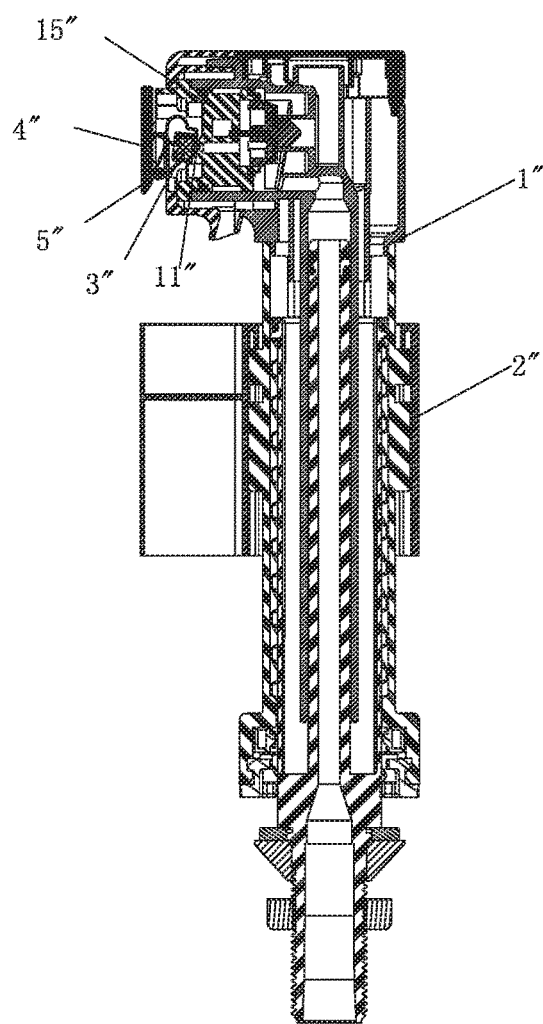
FIG. 15
FIG. 16

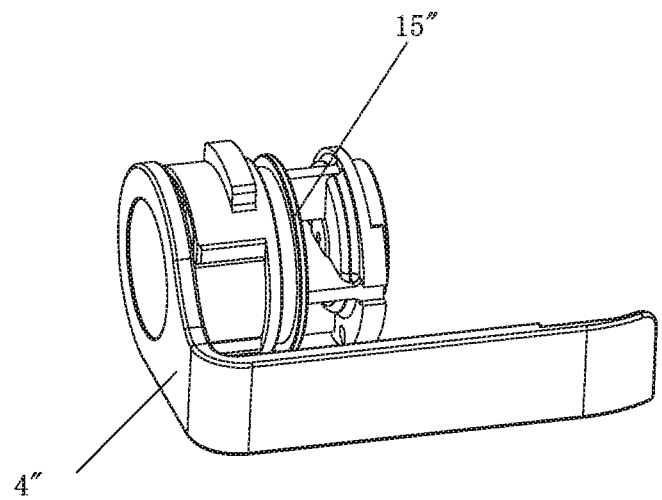
FIG. 21
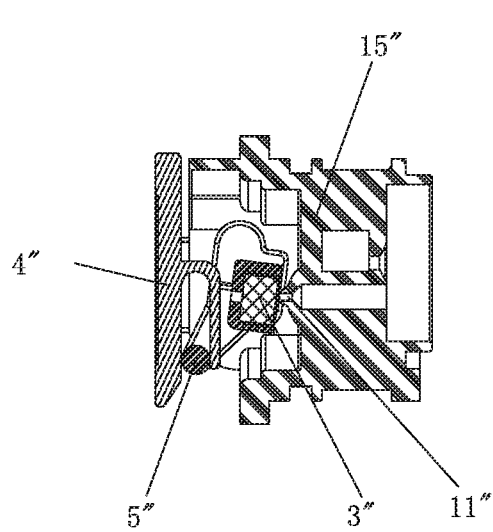 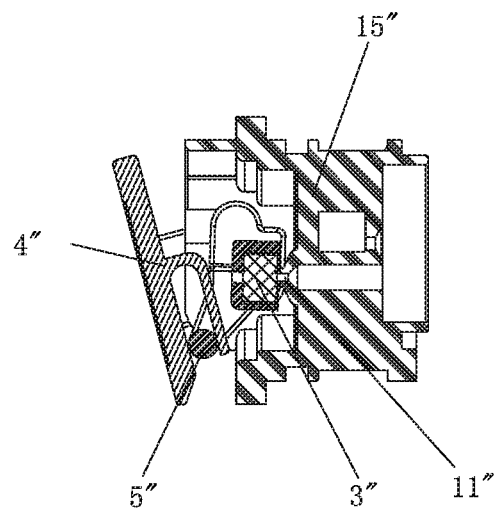
FIG. 22    FIG. 23

INLET VALVE WITH A SHORTENED LIFTING LEVER AND A METHOD OF SHORTENING THE LIFTING LEVER OF THE INLET VALVE

BACKGROUND OF THE INVENTION

1. Field of the Invention

The present invention relates to sanitary accessory, especially to an inlet valve applied in sanitary accessory.

2. Background of the Related Art

Existing known inlet valve, for example an inlet valve used in a toilet, for sealing under a high pressure, needs to make a long lifting lever to obtain a large lever ratio, thus obtaining a well sealing performance. However, with a long lever, the size of the inlet valve needs to be made large, so that the inlet valve with large size cannot couple to the existing water tank of the toile. To solve the problem, there is an inlet valve with the float made in a rotating way to shorten the lifting lever, but this kind of inlet valve has problems: one is that the height of the float cannot be adjusted, the other problem is that it needs rotating room for the rotating float, the whole inlet valve thus needs a large space.

SUMMARY OF THE INVENTION

The object of the present invention is to overcome the disadvantages of the existing technology and to provide an inlet valve with shortened lifting lever and a method of shortening the lifting lever of the inlet valve, it can obtain larger lever ratio but not increasing the size of the inlet valve.

The technical proposal of the present invention is that: An inlet valve with a shortened lifting lever, comprising a main body with a compression hole and a waterway, a sealing pad and a float, wherein further comprising a shortened lifting lever mechanism that is rotatably connected to the main body of the inlet valve, the shortened lifting lever comprises at least two stages of levers, the levers are connected in driving way one by one; the float is coupled to the first stage lever of the shortened lifting lever in linkage way, thus forming a dynamic body to drive the shortened lifting lever to move; the sealing pad is assembled to the last stage lever of the shortened lifting lever mechanism, the sealing pad closes the compression hole of the main body of the inlet valve or opens the compression hole with the movement of the shortened lifting lever when the float moves up and down.

In another preferred embodiment, the shortened lifting lever mechanism comprises two stages of levers, one is the first stage of lever, the other one is the last stage of lever, the first stage of lever and the last stage of lever are respectively rotatably connected to the main body of the inlet valve, the last stage of lever is disposed between the first stage of lever and the main body of the inlet valve, the first stage of lever is connected to the last of stage lever in driving way.

In another preferred embodiment, the length of the arm of force of each stage of lever of the shortened lifting lever mechanism is longer than the length of arm of resistance or equal to the length of arm of resistance.

In another preferred embodiment, the compression hole of the main body of the inlet valve is disposed at the top end of the main body of the inlet valve, the first stage of lever is connected to the top end of the main body in driving way, the last stage of lever is disposed between the first stage of lever and the top end of the main body of the inlet valve; both sides of the fulcrum of the first stage of lever are the lever arms respectively, one lever arm of the first stage of lever is connected to and coupled to the float by a link rod, the other lever arm is rotatably connected to the last stage of lever.

In another preferred embodiment, the first stage of lever comprises a first support arm and a second support arm, the first support arm and the second support arm are connected and forming an intersection angle between 0° and 180°; the first support arm is rotatably connected to the main body of the inlet valve and is rotatably connected to the last stage of lever, the last stage of lever is disposed between the first support arm and the main body of the inlet valve; the second support arm is rotatably connected to the float.

In another preferred embodiment, the compression hole is disposed at the top end of the main body of the inlet valve, the first support arm of the first stage of lever is rotatably connected to the top end of the main body of the inlet valve, the second support arm of the first stage of lever is rotatably connected to the float at the side surface of the main body of the inlet valve.

In another preferred embodiment, the compression hole of the main body of the inlet valve is disposed at the side surface of the top portion of the main body, the first support arm of the first stage of lever is rotatably connected to the side surface of the main body the compression hole is disposed, the second support arm of the first stage of lever is rotatably connected to the float at the side surface of the main body of the inlet valve.

In another preferred embodiment, the sealing pad and the other lever arm of the first stage of lever are disposed at the same side of the fulcrum of the last stage of lever or are disposed at the both sides.

In another preferred embodiment, the sealing pad and the first support arm of the first stage of lever are disposed at the same side of the fulcrum of the last stage of lever or are disposed at the both sides.

In another preferred embodiment, the other lever arm of the first stage of lever is disposed with a lock catch, the last stage of lever is disposed with a lock spindle, the lock catch and the lock spindle are connected flexibly.

In another preferred embodiment, the inner side of the first support arm of the first stage of lever is disposed with two parallel lugs, the first support arm of the first stage of lever is rotatably connected to the main body of the inlet valve by the two lugs.

In another preferred embodiment, two lugs are respectively extended with a lock catch, or the inner side of the first support arm is disposed with lock catch between the two lugs correspondingly, the last stage of lever is disposed with a lock spindle correspondingly, the lock catch and the lock spindle are connected flexibly.

In another preferred embodiment, one lever arm of the first stage of lever is disposed with a hole throughout up and down, the fulcrum of the last stage of lever is disposed in the hole.

A method of shortening a lifting lever of an inlet valve, the inlet valve comprising a main body with a compression hole and a waterway, a sealing pad and a float, wherein further comprising a shortened lifting lever mechanism that is rotatably connected to the main body of the inlet valve, the shortened lifting lever comprises at least two stages of levers, the levers are connected in driving way one by one; the sealing pad is assembled to the shortened lifting lever mechanism, the float is served as a dynamic body of the shortened lifting lever mechanism, the sealing pad closes the compression hole of the main body of the inlet valve or opens the compression hole when the float moves up and down to drive the shortened lifting lever to move.

In another preferred embodiment, the shortened lifting lever mechanism comprises two stages of levers, one is the first stage of lever, the other one is the last stage of lever, the first stage of lever and the last stage of lever are respectively rotatably connected to the main body of the inlet valve, the first stage of lever and the last stage of lever are connected in driving way; the float is linked to and coupled to the first stage of lever, the sealing pad is assembled to the last stage of lever.

In another preferred embodiment, the length of the arm of force of each stage of lever of the shortened lifting lever mechanism is longer than the length of arm of resistance or equal to the length of arm of resistance.

The technical proposal of the present invention has advantages that: as the inlet valve is disposed with two stages of levers, the levers are connected in driving way one by one; the float is linked to the first stage of lever of the shortened lifting lever mechanism, forming a dynamic body to drive the shortened lifting lever to move; the sealing pad is assembled to the last stage of lever of the shortened lifting lever mechanism, and it opens or closed the compression hole of the main body of the inlet valve by the moving of the shortened lifting lever when the float moves up and down, the present invention uses the driving connection of the multiple stages of levers to obtain larger lever ratio, thus shortening the length of the lifting lever, decreasing the whole size of the inlet valve, so that it makes a well applicability with every kind of water tank of the existing toilets.

The present invention will be further described with the drawings and the embodiments, but it has to be noted that, the scope of the present invention is not limited to the embodiments.

BRIEF DESCRIPTION OF THE DRAWINGS

FIG. 15 illustrates an axonometric diagram of the third embodiment of the present invention;

FIG. 16 illustrates a sectional diagram of the third embodiment of the present invention;

FIG. 21 illustrates a schematic diagram of the assembly of the lever and the side cover of the inlet valve of the third embodiment of the present invention;

FIG. 22 illustrates a first sectional view of FIG. 21 of the third embodiment when the compression hole is open; and FIG. 23 illustrates a second sectional view of FIG. 21 of the third embodiment when the compression hole is closed.

DETAILED DESCRIPTION OF THE EMBODIMENTS

The First Embodiment

Figure 1:
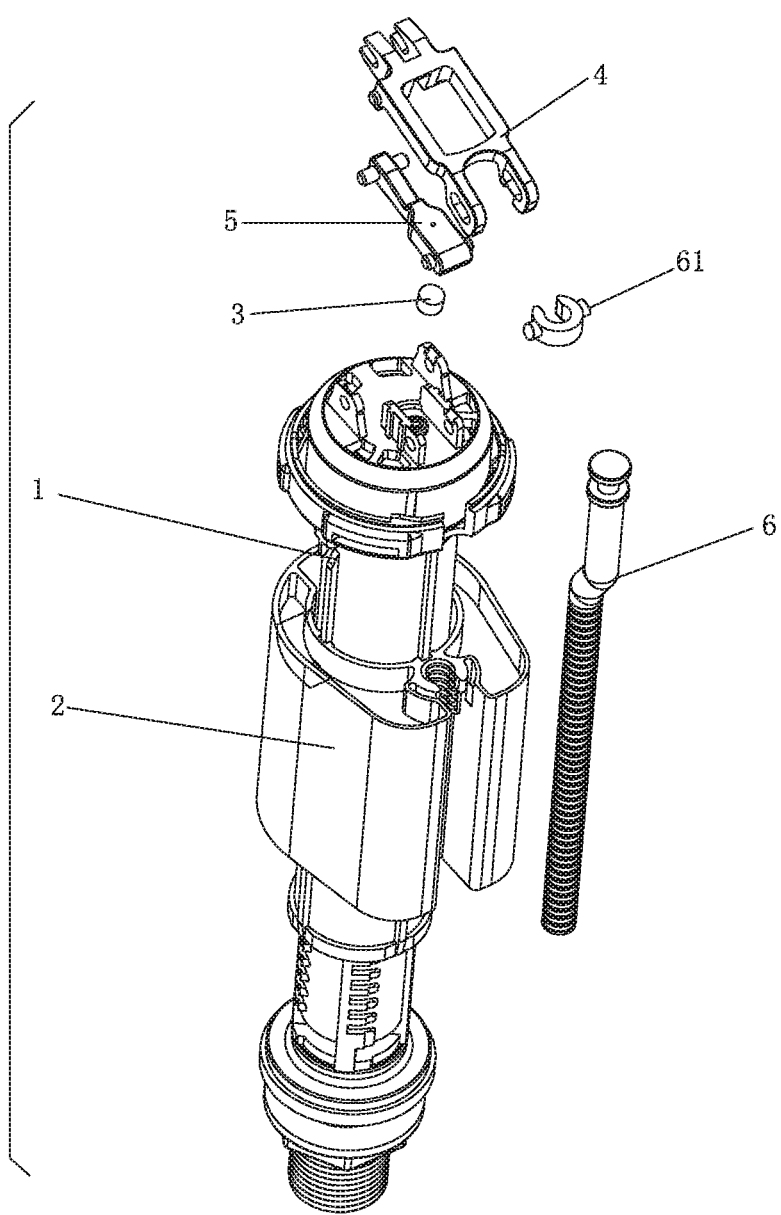
FIG. 1 illustrates an exploded and schematic diagram of a first embodiment of the present invention.
Figure 2:
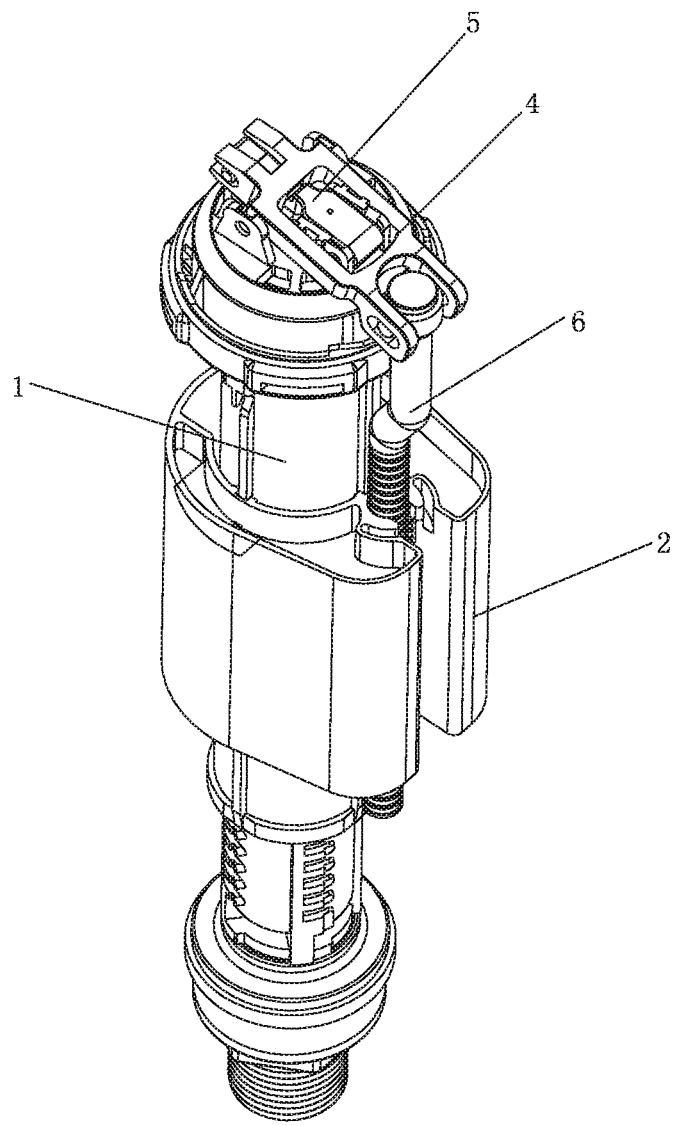
FIG. 2 illustrates an axonometric diagram of the first embodiment of the present invention.
Figure 3:
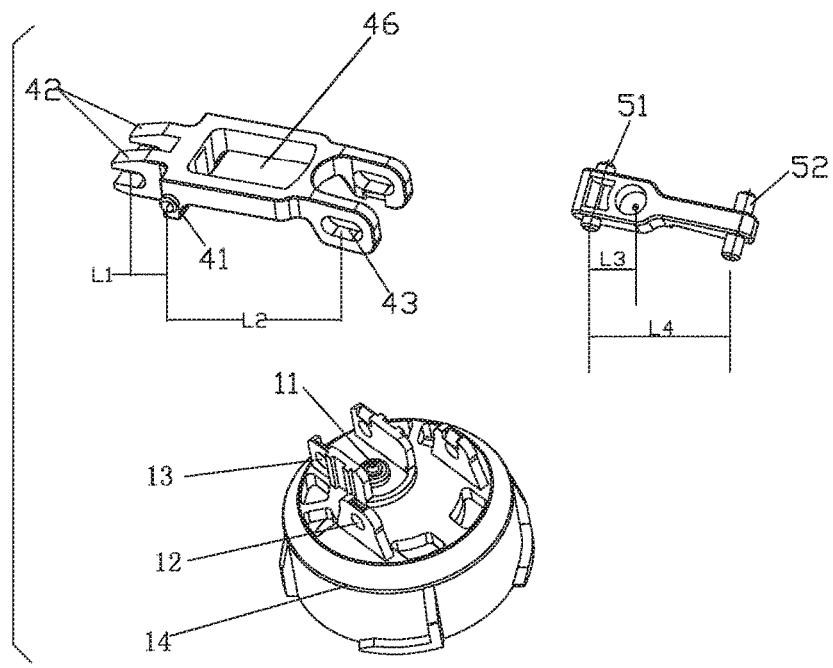
FIG. 3 illustrates an exploded and schematic diagram of the top portion of the first embodiment of the present invention.

A method of shortening a lifting lever of an inlet valve of the present invention is disclosed, the inlet valve comprising a main body with a compression hole and a waterway, a sealing pad and a float, further comprising a shortened lifting lever mechanism that is rotatably connected to the main body of the inlet valve, the shortened lifting lever comprises at least two stages of levers, the levers are connected in driving way one by one, forming a folding state; the sealing pad is assembled to the shortened lifting lever mechanism, the float is served as a dynamic body of the shortened lifting lever mechanism, the sealing pad closes the compression hole of the main body of the inlet valve or opens the compression hole when the float moves up and down to drive the shortened lifting lever to move.

The shortened lifting lever mechanism comprises two stages of levers, one is the first stage of lever, the other one is the last stage of lever, the first stage of lever and the last stage of lever are respectively rotatably connected to the main body of the inlet valve, the first stage of lever and the last stage of lever are connected in driving way; the float is linked to and coupled to the first stage of lever, the sealing pad is assembled to the last stage of lever.

The length of the arm of force of each stage of lever of the shortened lifting lever mechanism is longer than the length of arm of resistance or equal to the length of arm of resistance.

Please referring to FIGS. 1-5, an inlet valve with a shortened lifting lever of the present invention comprises a main body 1 with a compression hole 11 and a waterway, a sealing pad 3 and a float 2, further comprising a shortened lifting lever mechanism that is rotatably connected to the main body 1 of the inlet valve, the shortened lifting lever comprises two stages of levers: a first stage of lever 4 and a last stage of lever 5, the first stage of lever 4 and the last stage of lever 5 are respectively rotatably connected to the main body 1 of the inlet valve, the last stage of lever 5 is disposed between the first stage of lever 4 and the main body 1 of the inlet valve, the first stage of lever 4 and the last stage of lever 5 are connected in driving way. The float 2 is linked to and coupled to the first stage of lever 4 of the shortened lifting lever mechanism, thus forming a dynamic body to drive the shortened lifting lever mechanism to move; the sealing pad 3 is assembled to the last stage of lever 5 of the shortened lifting lever mechanism, and it closes or opens the compression hole of the main body 1 of the inlet valve by the moving of the shortened lifting lever when the float 2 moves up and down.

Preferred, the compression hole 11 of the main body 1 of the inlet valve is disposed at the top end of the main body 1 of the inlet valve, the first stage of lever 4 is rotatably connected to the top end of the main body 1 of the inlet valve, the last stage of lever 5 is disposed between the first stage of lever 4 and the top end of the main body 1; both sides of the fulcrum of the first stage of lever 4 are lever arms, one lever arm of the first stage of lever 4 is connected to the float 2 by a link rod 6, the other lever arm is rotatably connected to the last stage of lever 5. The top end of the main body 1 of the inlet valve is disposed with two pairs of spindle holes 12, 13, in detail, the top end of the main body 1 of the inlet valve is disposed with a cover 14, the compression hole 11 and the two pairs of spindle holes 12, 13 are respectively disposed in the cover 14, the intersection position of the two lever arms of the first stage of lever 4 is disposed with a first rotating spindle 41, the first rotating spindle 41 is sleeved on one pair of the spindle holes 12, forming the fulcrum of the first stage of lever 4. The last stage of lever 5 is disposed below the first stage of lever 4, one end of the last stage of lever 5 is disposed with a second rotating spindle 51, the second rotating spindle 51 is sleeved on the other pair of spindle holes 13 of the cover 14, forming the fulcrum of the last stage of lever 5. The free end of one lever arm of the first stage of lever 4 is disposed with a pair of spindle holes 43, a rotating spindle 61 at the top end of the link rod 6 is sleeved on the pair of the spindle holes 43, so that when the link rod 6 moves up and down with the float 2, it drives the first stage of lever 4 rotates upwardly and downwardly. Herein, for assembly convenience, one lever arm of the first stage of lever is disposed with a hole 46 throughout up and down, the fulcrum of the last stage of lever 5 is disposed in the area of the hole 46.

Preferred, the other lever arm of the first stage of lever 4 is rotatably connected to the last stage of lever 5, in detailed, the free end of the other lever arm of the first stage of lever 4 is extended outwardly with two lock catches 42, the lock catch 42 is U shaped respectively, the last stage of lever 5 (in the other end of the last stage of lever) is disposed with a lock spindle 52 correspondingly, two lock catches 42 and the lock spindle 52 form flexible connecting. The sealing pad 3 is assembled to the inner side of the last stage of lever 5 in embedding way, and the sealing pad and the other lever arm of the first stage of lever 4 are disposed at the same side of the fulcrum of the last stage of lever 5, in detailed, the sealing pad is disposed between both ends of the last stage of lever 5. In other cases, the sealing pad and the other lever arm of the first stage of lever can be disposed at two sides of the fulcrum of the last stage of lever 5.

The inlet valve with a shortened lifting lever of the present invention is provided that with above structure, the total lever ratio=L2/L1×L4/L3, L1, L2 are respectively the length of arm of resistance of the first stage of lever, and L2>L1, L3, L4 are respectively the length of arm of resistance and the length of arm of force of the last stage of lever, and L4>L3.

Figures 4, 5:
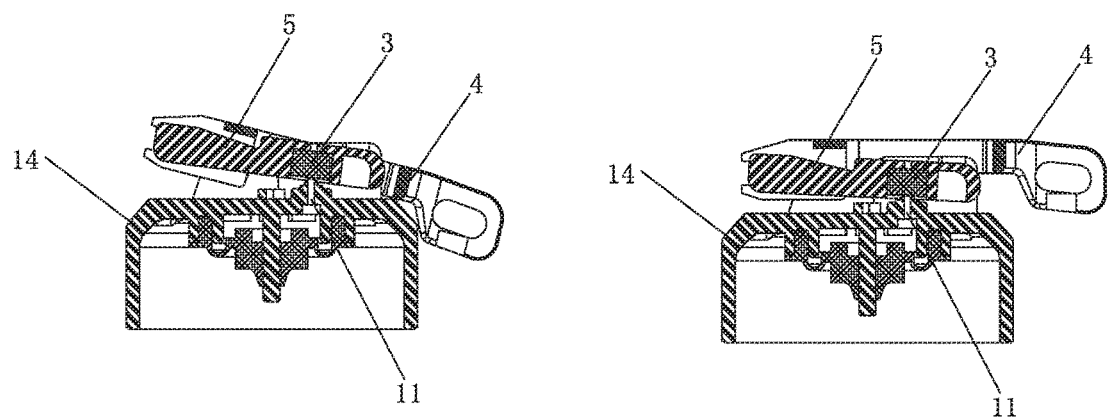
FIG. 4 illustrates a first sectional diagram of the top portion of the first embodiment of the present invention when the compression hole is open.
FIG. 5 illustrates a second sectional diagram of the top portion of the first embodiment of the present invention when the compression hole is closed.
Figure 6:
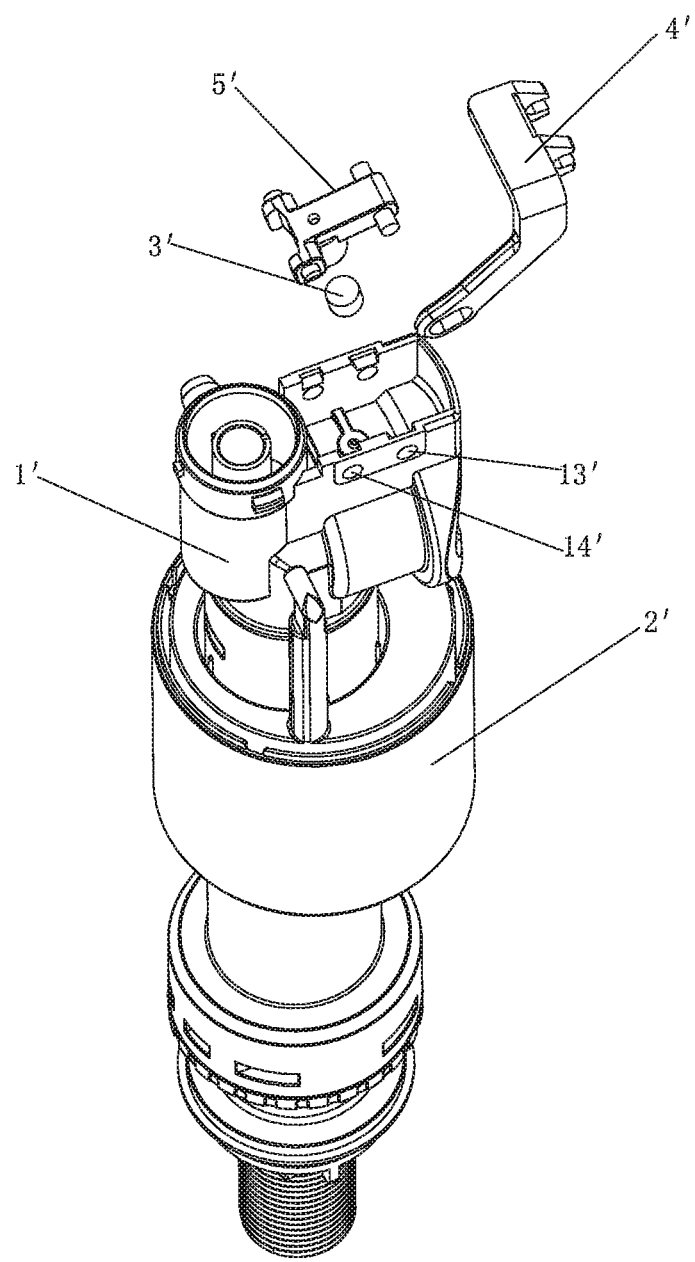
FIG. 6 illustrates an exploded and schematic diagram of a second embodiment of the present invention.
Figure 7:
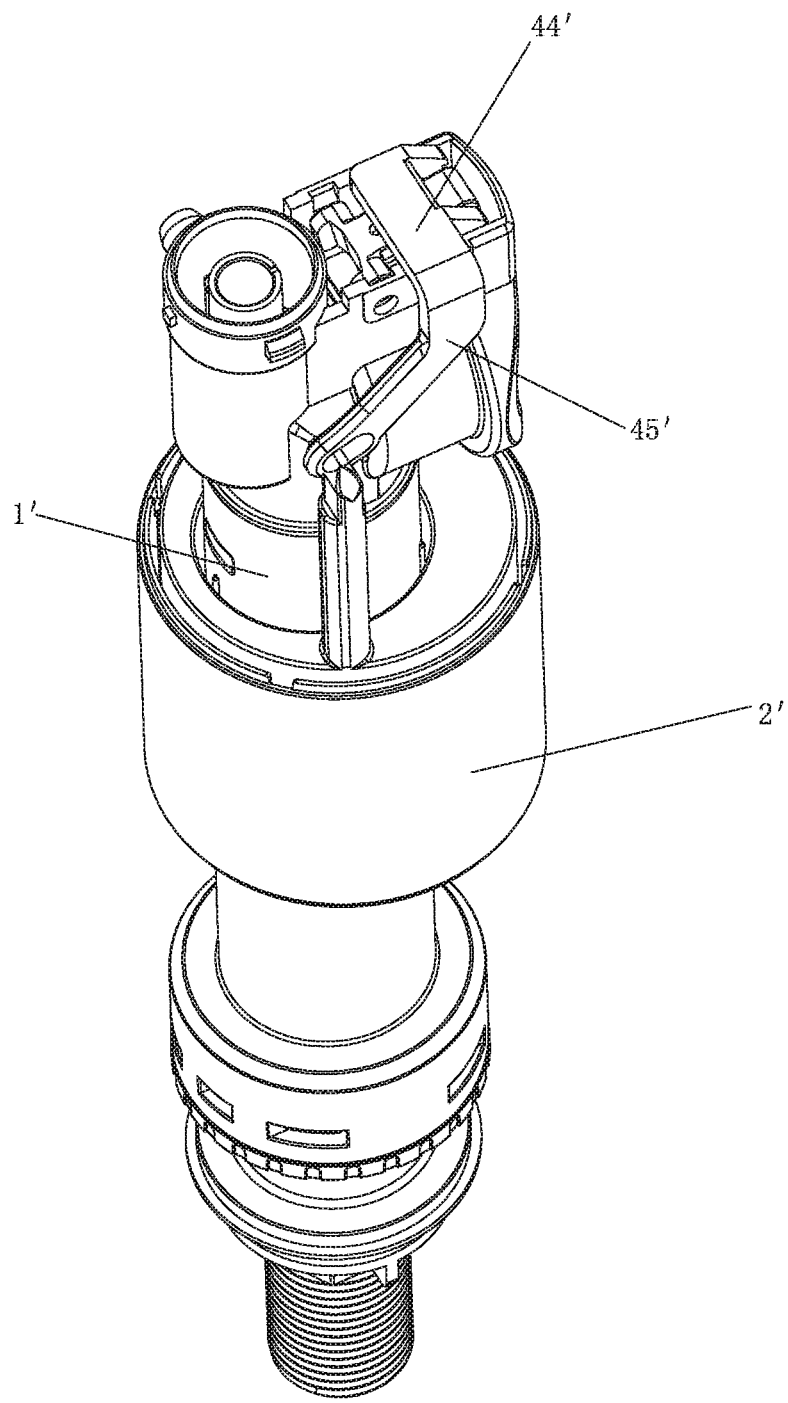
FIG. 7 illustrates an axonometric diagram of the second embodiment of the present invention.
Figure 8:
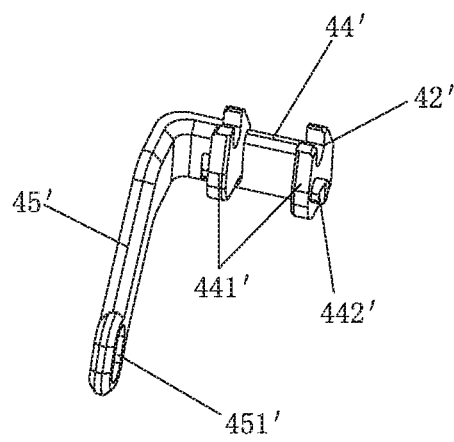
FIG. 8 illustrates an axonometric diagram of the first stage of lever of the second embodiment of the present invention.
Figure 9:
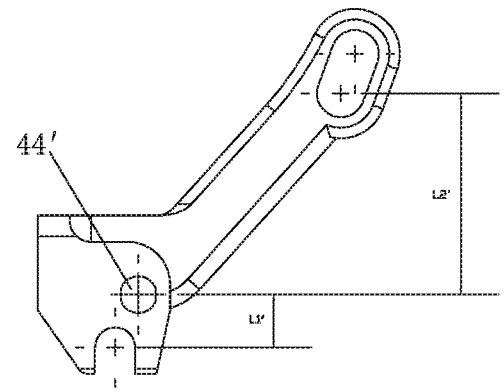
FIG. 9 illustrates a side view of the first stage of lever of the second embodiment of the present invention.
Figure 10:
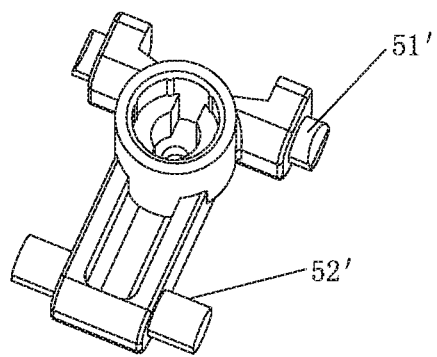
FIG. 10 illustrates an axonometric diagram of the last stage of lever of the second embodiment of the present invention.
Figure 11:
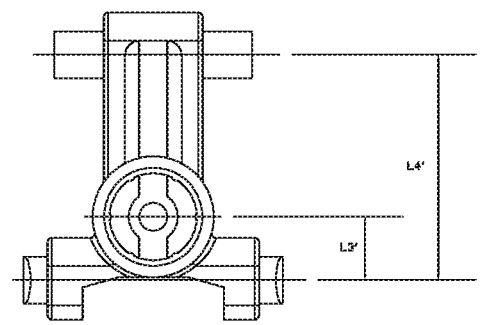
FIG. 11 illustrates a bottom view of the last stage of lever of the second embodiment of the present invention.

The working process of the inlet valve with a shortened lifting lever of the present invention is that: as figured in FIG. 4, when the float 2 moves downwardly, the first stage of lever 4 rotates clockwise in a certain angle about its fulcrum by the link rod 6, so that the other lever arm of the first stage of lever 4 lifts the last stage of lever 5, the last stage of lever 5 rotates clockwise in corresponding angle about its fulcrum to lift the sealing pad 3, thus opening the compression hole 11 of the main body 1 of the inlet valve, as figured in FIG. 4; when the float 2 moves upwardly, the first stage of lever 4 rotates counter-clockwise in a certain angle about its fulcrum by the link rod 6, so that the other lever arm of the first stage of lever 4 lifts the last stage of lever 5, the last stage of lever 5 rotates counter-clockwise in corresponding angle about its fulcrum to put down the sealing pad 3, thus closing the compression hole 11 of the main body 1, as figured in FIG. 5.

The Second Embodiment

Please referring to FIGS. 6-13, the inlet valve with a shortened lifting lever of the present invention of this embodiment has difference from the first embodiment that: the first stage of lever 4' comprises a first support arm 44' and a second support arm 45', the first support arm 44 and the second support arm 45' are connected in once forming and they have an intersection angle between 0° and 180°, in detailed, in the second embodiment, the first support arm 44' and the second support arm 45' form L shaped structure, the first support arm 44' of the first stage of lever 4' is rotatably connected to the main body 1' of the inlet valve, and it is rotatably connected to the last stage of lever 5'; the second support arm 45' is rotatably connected to the float 2', so that the first stage of lever 4' rotates about its fulcrum when the float 2' moves up and down.

Preferred, the compression hole 11' of the main body 1' of the inlet valve is disposed at the top end of the main body 1', the first support arm 44' of the first stage of lever 4' is rotatably connected to the top end of the main body 1' of the inlet valve, the second support arm 45' of the first stage of lever is rotatably connected to the float 2' at the side surface of the main body 1' of the inlet valve.

Preferred, the inner side of the first support arm 44' of the first stage of lever 4' is extended with two parallel lugs 441', the first support arm 44' of the first stage of lever 4' is rotatably connected to the top end of the main body 1' by the two lugs 441'. In detailed, the opposite outer sides of the two lugs 441' are respectively disposed with a first rotating spindle 41', the top portion of the main body 1' of the inlet valve is disposed with two pairs of spindle holes 12',13', the first rotating spindle 41' of the first stage of lever 4' is sleeved on one pair of the spindle holes 12', forming the fulcrum of the first stage of lever 4'. The last stage of lever 5' is disposed below the first support arm 44' of the first stage of lever 4', one end of the last stage of lever 5' is disposed with a second rotating spindle 51', the rotating spindle 51' is sleeved on the other pair of spindle holes 13' of the top portion of the main body 1' of the inlet valve, forming the fulcrum of the last stage of lever 5'. The free end of the second support arm 45' of the first stage of lever 45' is disposed with a spindle hole 451', a rotating spindle of the float 2' is sleeved on the spindle hole 451. Similar to the first embodiment, two lugs 441' of the first stage of lever 4' are respectively extended with a lock catch 42', the lock catches 42' are U shaped, the other end of the last stage of lever 5' is disposed with a lock spindle 52', two lock catches 42' and the lock spindle 52' are connected flexibly respectively.

The inlet valve with a shortened lifting lever of the present invention is provided that with above structure, a total lever ratio=L2'/L1'×L4'/L3', L1', L2' are respectively a length of arm of resistance and a length of arm of force of the first stage of lever 4', and L2'>L1', L3', L4' are respectively a length of arm of resistance and a length of arm of force of the last stage of lever 5', and L4'>L3'.

Figure 12:
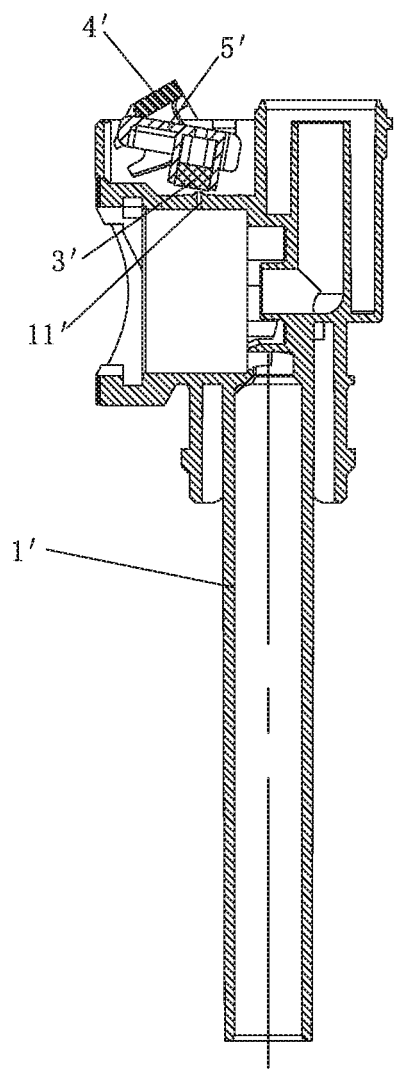
FIG. 12 illustrates a first partial sectional diagram of the second embodiment of the present invention when the compression hole is open.
Figure 13:
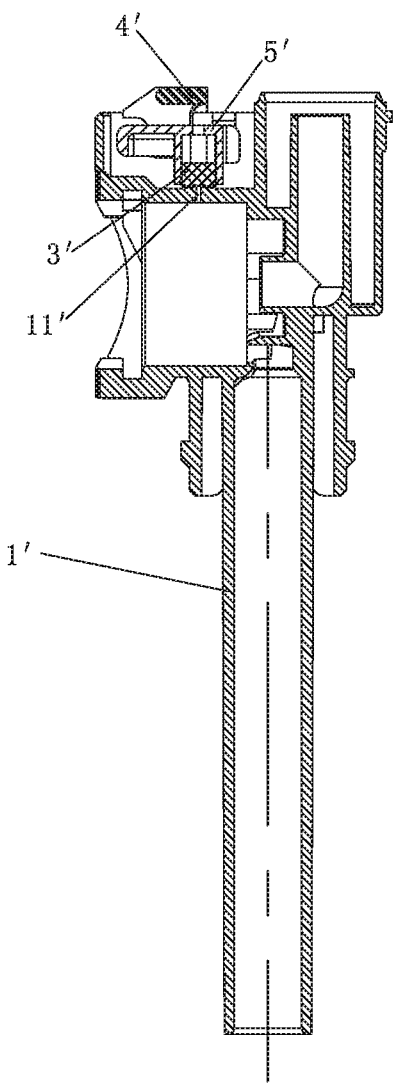
FIG. 13 illustrates a second partial sectional diagram of the second embodiment of the present invention when the compression hole is closed.
Figure 14:
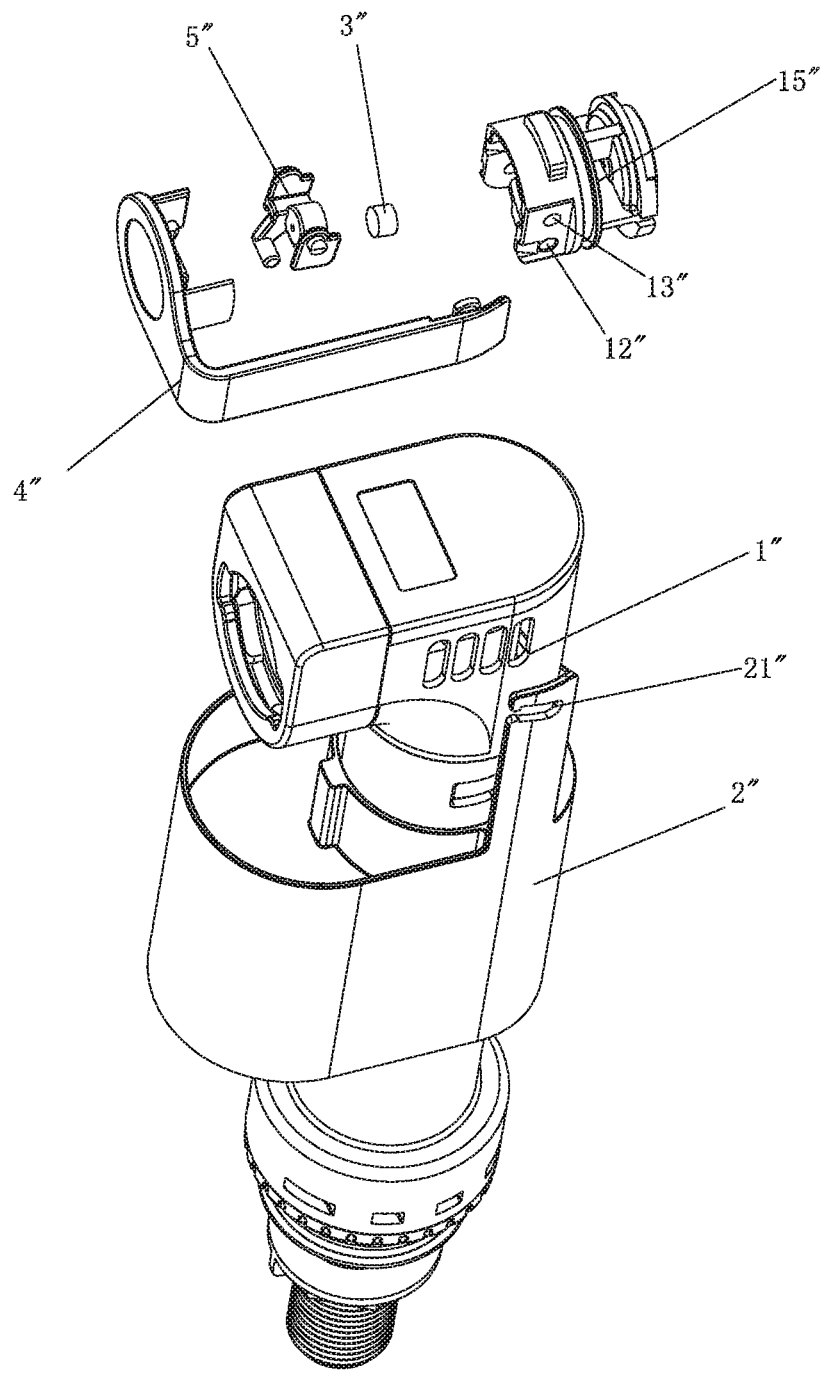
FIG. 14 illustrates an exploded and schematic diagram of a third embodiment of the present invention.
Figures 17, 19:
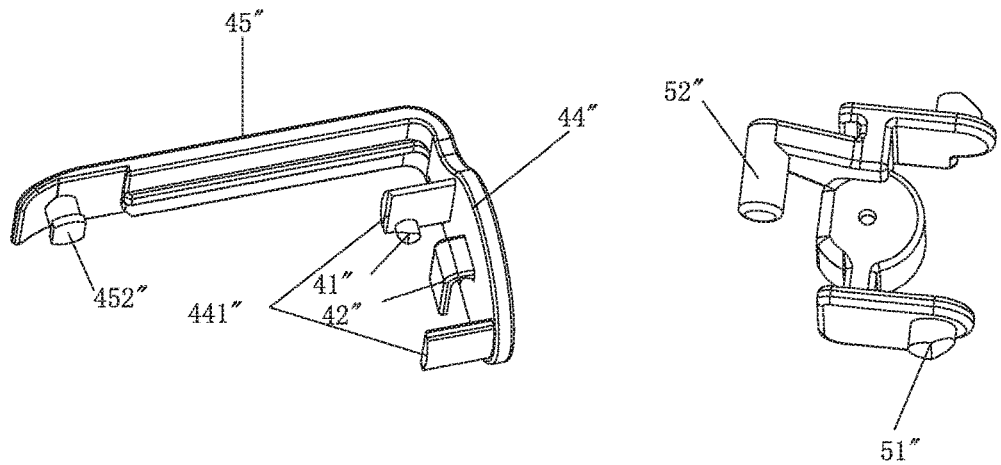
FIG. 17 illustrates an axonometric diagram of the first stage of lever of the third embodiment of the present invention.
FIG. 19 illustrates a first axonometric diagram of the last stage of lever of the third embodiment of the present invention.
Figures 18, 20:
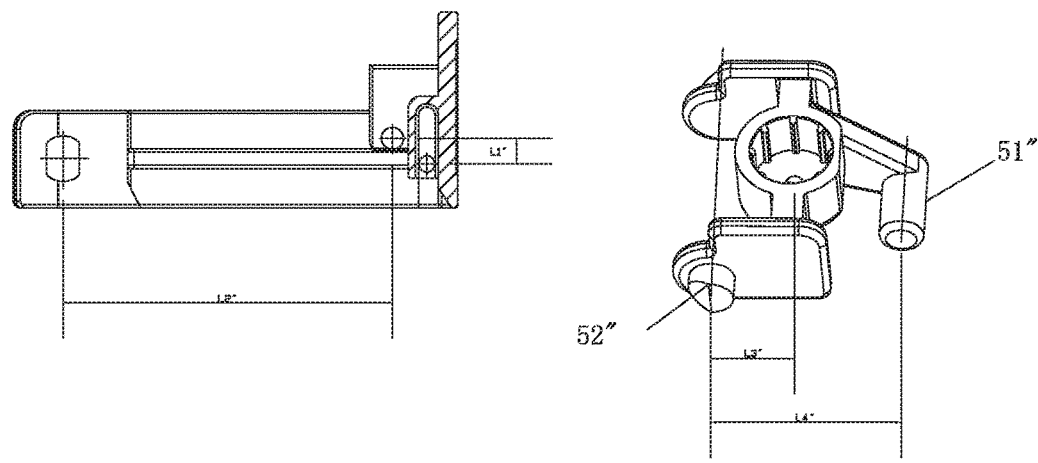
FIG. 18 illustrates a side view of the first stage of lever of the third embodiment of the present invention.
FIG. 20 illustrates a second axonometric diagram of the last stage of lever of the third embodiment of the present invention.

The working process of the inlet valve with a shortened lifting lever of the present invention is that: when the float 2' moves downwardly, the support arm 45' of the first stage of lever 4' drives the first stage of lever 4' to rotate clockwise in a certain angle about its fulcrum under the work of the float 2', so that the first support arm of the first stage of lever 4' lifts the last stage of lever 5', the last stage of lever 5' rotates clockwise in corresponding angle about its fulcrum to lift the sealing pad 3', thus opening the compression hole 11' of the main body 1' of the inlet valve, as figured in FIG. 12; when the float 2' moves upwardly, the first stage of lever 4' rotates counter-clockwise in a certain angle about its fulcrum by the link rod 6', so that the other lever arm of the first stage of lever 4' lifts the last stage of lever 5', the last stage of lever 5' rotates counter-clockwise in corresponding angle about its fulcrum to put down the sealing pad 3', thus closing the compression hole 11' of the main body 1', as figured in FIG. 13.

The Third Embodiment

Please referring to FIGS. 14-23, the inlet valve with a shortened lifting lever of the present invention of this embodiment has difference from the second embodiment that: the compression hole 11" of the main body 1" of the inlet valve is disposed at the side surface of the top end of the main body 1" of the inlet valve, the first support arm 44" of the first stage of lever 4" is rotatably connected to the side surface the compression hole 11" of the main body 1" of the inlet valve is disposed, the second support arm 45" of the first stage of lever 4" is rotatably connected to the float 2" at the side surface of the main body 1" of the inlet valve.

Similar to the second embodiment, the inner side of the first support arm 44" of the first stage of lever 4" is extended with two parallel lugs 441", the first support arm 44' of the first stage of lever 4" is rotatably connected to the top end of the main body 1" by the two lugs 441". In detailed, the opposite inner side of the two lugs 441' are respectively disposed with a first rotating spindle 41", the side surface of the top portion of the main body 1" of the inlet valve is disposed with two pairs of spindle holes 12", 13" at the corresponding position, in detailed, the two pairs of spindle holes 12", 13" are assembled to a side cover 15" at the side surface of the top portion of the main body 1" of the inlet valve, the compression hole 11" of the main body 1" is disposed at the side cover 15 as well, the first rotating spindle 41" of the first stage of lever 4" is sleeved on one pair of the spindle holes 12", forming the fulcrum of the first stage of lever 4". The last stage of lever 5" is disposed at the inner side of the first support arm 44' of the first stage of lever 4", one end of the last stage of lever 5" is disposed with a second rotating spindle 51", the second rotating spindle 51" is sleeved on the other pair of spindle holes 13" of the side cover 15" of the inlet valve, forming the fulcrum of the last stage of lever. The free end of the second support arm 45" of the first stage of lever 4" is disposed with a protruding spindle 452" that is hung to a hang hole 21" of the float 2". Similar to the second embodiment, the first stage of lever 4" is disposed with a lock catch 42", the lock catches 42" is disposed at the inner side of the first support arm 44" and is disposed between the two lugs 441", the lock catch 42" is L shaped. Correspondingly, the other end of the last stage of lever is disposed with a lock spindle 52", the lock spindle 52" and the lock catch 42" of the first stage of lever 4" are connected flexibly.

The inlet valve with a shortened lifting lever of the present invention is provided that with above structure, a total lever ratio=L2"/L1"×L4"/L3", L1", L2" are respectively a length of arm of resistance and a length of arm of force of the first stage of lever 4", and L2">L1", L3", L4" are respectively a length of arm of resistance and a length of arm of force of the last stage of lever 5", and L4">L3".

The working process of the inlet valve with a shortened lifting lever of the present invention is that: when the float 2" moves downwardly, the support arm 45" of the first stage of lever 4" drives the first stage of lever 4" to rotate clockwise in a certain angle about its fulcrum under the work of the float 2", so that the first support arm 44" of the first stage of lever 4" lifts the last stage of lever 5", the last stage of lever 5" rotates clockwise in corresponding angle about its fulcrum to lift the sealing pad 3", thus opening the compression hole 11" of the main body 1" of the inlet valve, as figured in FIG. 22; when the float 2" moves upwardly, the first stage of lever 4" rotates counter-clockwise in a certain angle about its fulcrum by the link rod 6", so that the other lever arm of the first stage of lever 4" lifts the last stage of lever 5", the last stage of lever 5" rotates counter-clockwise in a corresponding angle about its fulcrum to put down the sealing pad 3", thus closing the compression hole 11" of the main body 1", as figured in FIG. 23.

The inlet valve with a shortened lifting lever of the present invention is provided that the number of the levers is not limited to two, that is to say, the shortened lifting lever mechanism can comprise more than two stages of levers, when it comprises more than two stages of levers, the connecting structure and the working principle are similar to above mentioned embodiment, so that it would not described hereafter. Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

INDUSTRIAL APPLICABILITY

The present invention provides an inlet valve with a shortened lifting lever and a method of shortening the lifting lever of the inlet valve, the inlet valve has two stages of levers, it obtains larger lever ratio that can shorten the length of the lifting lever and not increase the size of the inlet valve. The present invent is applicable to every kind of toilet with well industrial applicability.

The invention claimed is:
1. A method of shortening a lifting lever mechanism of an inlet valve, comprising:
provideing the inlet valve comprising
a main body having defined therein compression hole and a waterway passage;
a sealing pad;

a float that surrounds the main body and is movable up and down around the main body; and the lifting lever mechanism that is rotatably connected to the main body of the inlet valve; and shortening the lifting lever mechanism by configuring a shortened lifting lever mechanism that comprises at least two stages of levers, that each have a fulcrum, respectively, and that include a first stage lever and a last stage lever that are connected in a driving way one by one, wherein the float is coupled to the first stage lever of the shortened lifting lever mechanism and forms a dynamic body to drive the shortened lifting lever mechanism to move, wherein the sealing pad is assembled to the last stage lever of the shortened lifting lever mechanism, so that the sealing pad opens or closes the compression hole of the main body of the inlet valve when the float moves up and down to drive the shortened lifting lever to move, and wherein each of the lever stages of the at least two lever stages has a respective length of arm of force and a respective length of arm of resistance, and wherein the respective length of arm of force is longer than or equal to the respective length of arm of resistance, respectively, and wherein the first stage lever and the last stage lever are respectively rotatably connected to the main body of the inlet valve, the last stage lever is disposed between the first stage lever and the main body of the inlet valve, and the first stage lever is connected to the last stage lever in a driving way.

2. The method according to claim 1, wherein the shortened lifting lever mechanism comprises two stages of levers, of which one is the first stage lever and the other one is the last stage lever, the float is linked to and coupled to the first stage lever, and the sealing pad is assembled to the last stage lever.

3. An inlet valve having a shortened lifting lever mechanism, comprising:

a main body having defined therein a compression hole and a waterway passage;

a sealing pad;

a float that surrounds the main body and is movable up and down around the main body; and the shortened lifting lever mechanism that is rotatably connected to the main body of the inlet valve, that comprises at least two lever stages that each have a fulcrum, respectively, and that include a first stage lever and a last stage lever that are connected in a driving way one by one, wherein the float is coupled to the first stage lever so that a dynamic body is formed to drive the shortened lifting lever mechanism to move, wherein the sealing pad is assembled to the last stage lever so that the sealing pad opens or closes the compression hole of the main body of the inlet valve with movement of the shortened lifting lever mechanism when the float moves up and down, wherein each of the lever stages of the at least two lever stages has a respective length of arm of force and a respective length of arm of resistance, and wherein the respective length of arm of force is longer than or equal to the respective length of arm of resistance, respectively, and wherein the first stage lever and the last stage lever are respectively rotatably connected to the main body of the inlet valve, the last stage lever is disposed between the first stage lever and the main body of the inlet valve, and the first stage lever is connected to the last stage lever in a driving way.

4. The inlet valve according to claim 3, wherein the first stage lever comprises a first support arm and a second support arm, the first support arm and the second support arm are connected and form an intersection angle that ranges between 0° and 180, wherein the first support arm is rotatably connected to the main body of the inlet valve and is rotatably connected to the last stage lever, and the last stage lever is disposed between the first support arm and the main body of the inlet valve, and wherein the second support arm is rotatably connected to the float.

5. The inlet valve according to claim 4, wherein the compression hole is disposed at a top end of the main body of the inlet valve, the first support arm of the first stage lever is rotatably connected to the top end of the main body of the inlet valve, and the second support arm of the first stage lever is rotatably connected to the float at a side surface of the main body of the inlet valve.

6. The inlet valve according to claim 4, wherein the last stage lever has a first support arm and a second support arm provided on either side of the fulcrum of the last stage lever, respectively, and wherein the sealing pad and the first support arm of the first stage lever are disposed at a same side or on either side of the fulcrum of the last stage lever.

* * * * *